United States Patent
Lapiere et al.

(10) Patent No.: US 9,476,765 B2
(45) Date of Patent: *Oct. 25, 2016

(54) ULTRAVIOLET MONITORING DEVICE

(71) Applicant: ECD Holding Company, LLC, Chicago, IL (US)

(72) Inventors: Jean-Christophe Lapiere, Chicago, IL (US); Mathieu Jean-Claude Andrew Hardy, Chicago, IL (US); Nicholas Michel Jacques Longo, Chicago, IL (US)

(73) Assignee: SkinIO, LLC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,980

(22) Filed: Mar. 28, 2016

(65) Prior Publication Data

US 2016/0209265 A1    Jul. 21, 2016

Related U.S. Application Data

(63) Continuation of application No. 14/470,419, filed on Aug. 27, 2014, now Pat. No. 9,316,533.

(51) Int. Cl.
*G01J 1/42* (2006.01)
*G01J 1/02* (2006.01)
*G08B 21/24* (2006.01)

(52) U.S. Cl.
CPC ............. *G01J 1/429* (2013.01); *G01J 1/0219* (2013.01); *G01J 1/0266* (2013.01); *G08B 21/24* (2013.01); *G01J 2001/4266* (2013.01)

(58) Field of Classification Search
CPC .................. G01J 1/42; G01J 1/429
USPC .............. 250/372, 370.15
See application file for complete search history.

(56) References Cited

U.S. PATENT DOCUMENTS

| | | |
|---|---|---|
| 4,229,733 A | 10/1980 | Tulenko et al. |
| 4,535,244 A | 8/1985 | Burnham |
| 4,608,492 A | 8/1986 | Burnham |
| 4,608,655 A | 8/1986 | Wolf et al. |
| 4,733,383 A | 3/1988 | Waterbury |
| 4,851,686 A | 7/1989 | Pearson |
| 4,962,910 A | 10/1990 | Shimizu |
| 4,985,632 A | 1/1991 | Bianco et al. |
| 5,036,311 A * | 7/1991 | Moran .............. G01J 1/429 250/372 |
| 5,107,123 A | 4/1992 | Shi |
| 5,500,532 A | 3/1996 | Kozicki |
| 5,686,727 A | 11/1997 | Reenstra et al. |
| 5,995,862 A | 11/1999 | Gallorini |

(Continued)

FOREIGN PATENT DOCUMENTS

WO    WO 2005/015138 A1    2/2005

OTHER PUBLICATIONS

Sep. 25, 2015 Office Action in connection with U.S. Appl. No. 14/470,419.

(Continued)

*Primary Examiner* — David Porta
*Assistant Examiner* — Meenakshi Sahu
(74) *Attorney, Agent, or Firm* — Hahn Loeser & Parks, LLP

(57) ABSTRACT

Monitoring a user's exposure to ultraviolet radiation, including determining the amount of radiation to which the user is exposed from different directions, respectively.

25 Claims, 7 Drawing Sheets

(56) References Cited

U.S. PATENT DOCUMENTS

| | | |
|---|---|---|
| 6,348,694 B1 | 2/2002 | Gershteyn et al. |
| 6,426,503 B1 | 7/2002 | Wuest |
| 6,628,201 B2 | 9/2003 | Cho et al. |
| 6,936,824 B2 | 8/2005 | Takada |
| 7,188,767 B2 | 3/2007 | Penuela et al. |
| 7,500,746 B1 | 3/2009 | Howell et al. |
| 7,818,142 B2 | 10/2010 | Schuler et al. |
| 8,044,363 B2 | 10/2011 | Ales et al. |
| 8,586,938 B2 | 11/2013 | Tsubata et al. |
| 2003/0150998 A1 | 8/2003 | Shin et al. |
| 2004/0031927 A1 | 2/2004 | Tsai et al. |
| 2013/0325357 A1 | 12/2013 | Walerow et al. |

OTHER PUBLICATIONS

"Cool Sunmate Ultraviolet UV Level Detector Meter Monitor" (eBay 2014).

"ICEPURE: The impact of climatic and environmental factors on personal ultraviolet radiation exposure and human health" (downloaded from www.icepure.eu/WP_descriptions.html on May 22, 2014).

"Netatamo's June bracelet gives you sunscreen suggestions using weather and skin type" (Vox Media 2014).

"Osun Cell-Shield" (Osun Technologies, downloaded from www.osuntech.com/Cell-Shiled.aspx on Apr. 28, 2014).

"Osun SM0010 SunMate UV Detector" (Amazon.com 2014).

"Personal UV Meter" (downloaded from www.utilicom.com.au/documents/74.html on May 22, 2014).

"Ultra Violet Light Detection Kit by Arbor Scientific" (Amazon.com 2014).

"UV Detector" (Sports Health 2013).

"UV HAWK Q31-UVHAWK2 Waterproof Ultraviolet Sunlight Meter" (Amazon.com 2014).

* cited by examiner

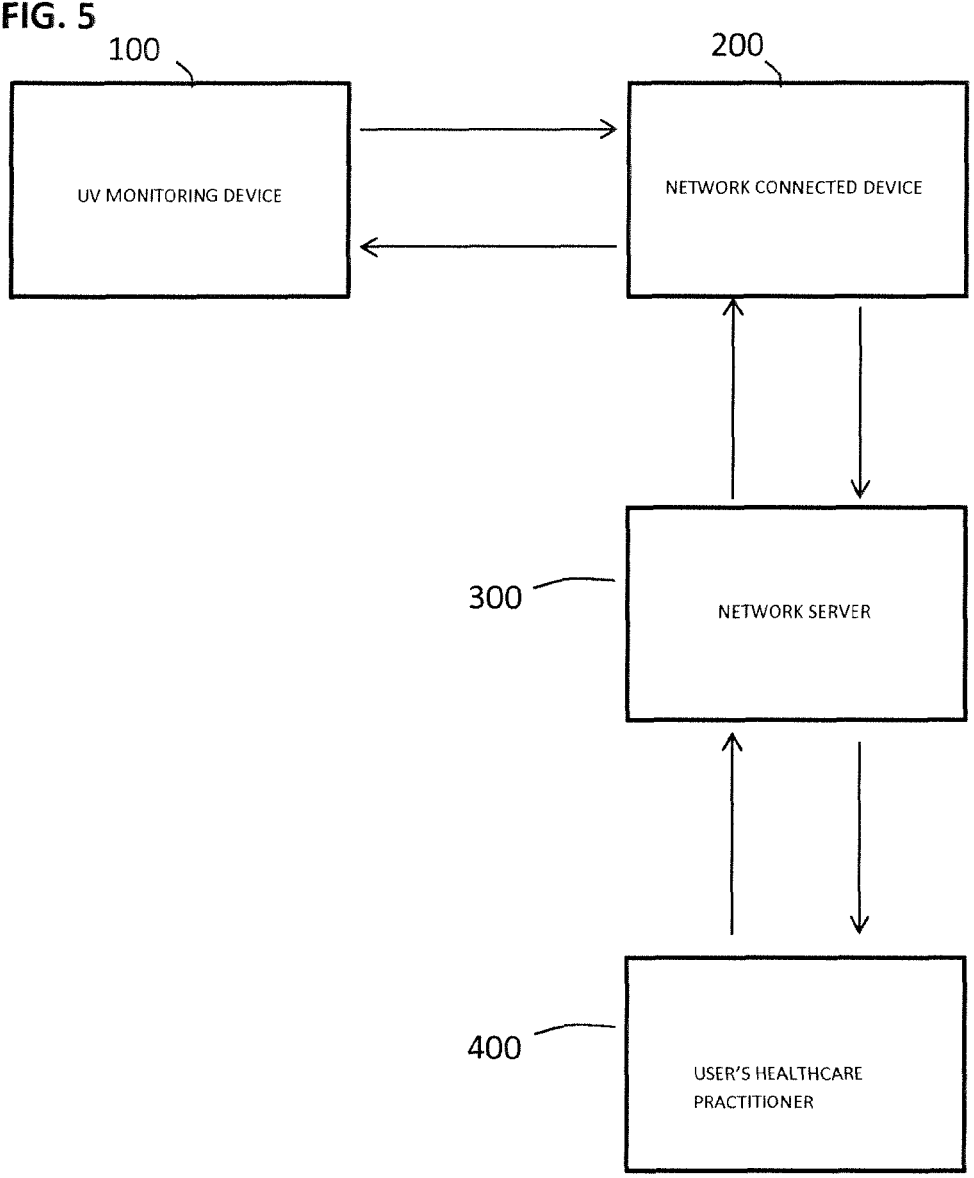

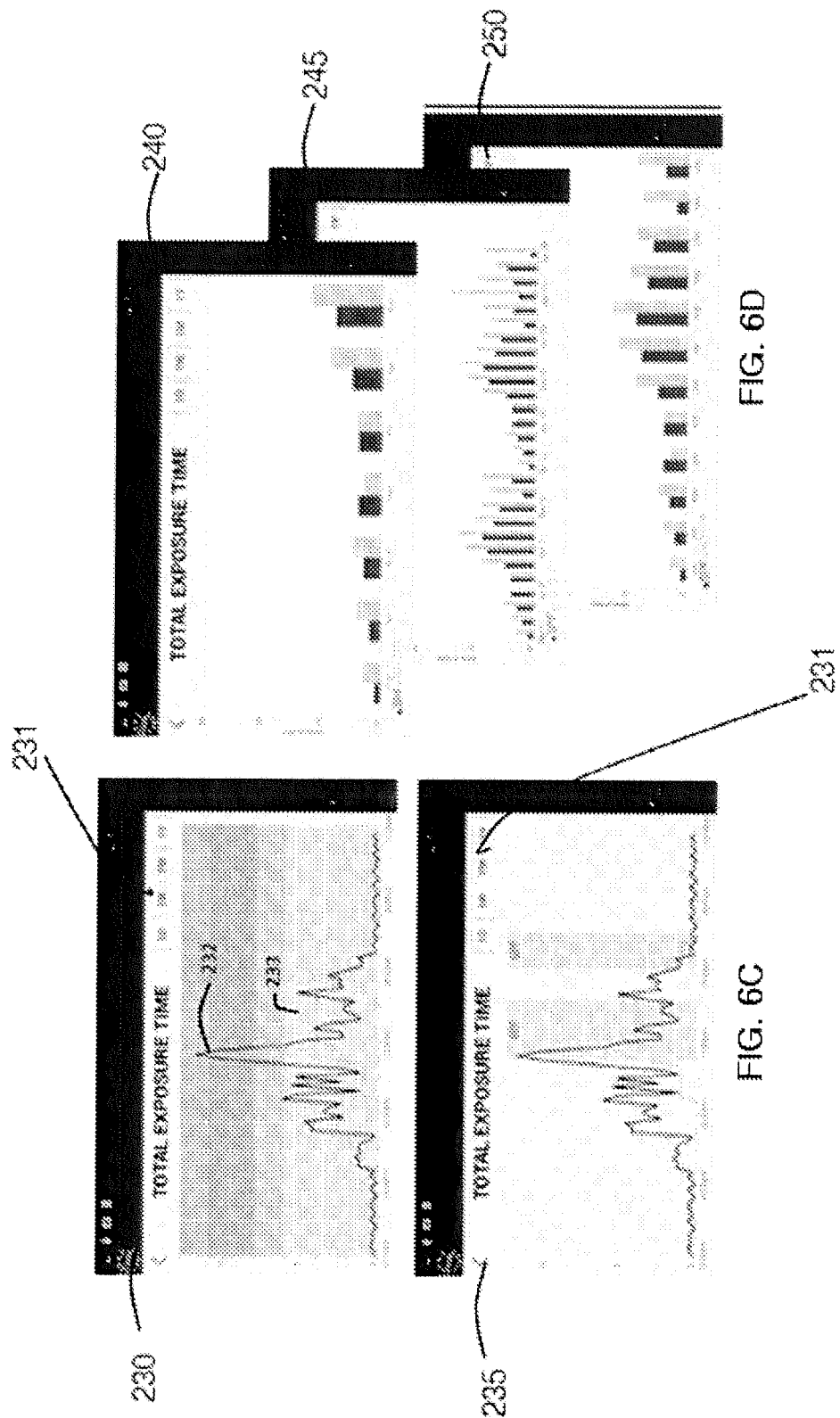

ULTRAVIOLET MONITORING DEVICE

The present application is a continuation of the co-pending Ser. No. 14/470,419, filed on Aug. 27, 2014.

The present invention pertains to a device for monitoring a user's exposure to ultraviolet radiation.

BACKGROUND

Ultraviolet (UV) light consists of radiation having a wavelength anywhere from 100 nm to 400 nm. Exposure to excessive UV radiation from the sun can be harmful, as it can lead to skin cancers such as Melanoma. Global incidence of Melanoma has increased to almost three times to what it was in 1981. This increase in skin cancer incidence is thought to be connected with an increase in recreational exposure to the sun and a history of sunburn. The potential harmfulness of incoming UV radiation is dependent on its intensity, which is measured on a scale called the UV index. The UV index value is directly proportional to the risk of harm from exposure. If the value is from 0-2.9, for example, the UV radiation presents a very low risk of harm to the average person. If the UV index at a particular time is above 11, however, an average person is at a very high risk of harm if they are unprotected.

Multiple techniques for protecting people from the harmful effects of UV radiation currently exist, including sunscreen. However, users of sunscreen commonly forget to reapply sunscreen when it is necessary for adequate protection.

In view of the prior art, a compact, interactive device capable of measuring the direction of incoming UV light and alerting the user of the need to apply sunscreen is needed for complete monitoring of the user's UV exposure.

BRIEF DESCRIPTION OF THE DRAWINGS

The following drawings illustrate the concepts of the present invention, and are not necessarily drawn to scale.

FIG. 5 depicts a system of using the UV monitoring device to allow both the user and the user's healthcare practitioner to view the information stored by memory on the device.

FIG. 6C displays an exemplary screenshot of an application that allows the UV monitoring device to display to the user the user's hour-by-hour exposure level to UV radiation and the hour-by-hour UV index forecast for the user's location.

FIG. 6D displays an exemplary screenshot of an application that allows the UV monitoring device to display to the user the user's exposure time to UV radiation with and without sunscreen in different time intervals and time frames.

DETAILED DESCRIPTION

Figure 1:
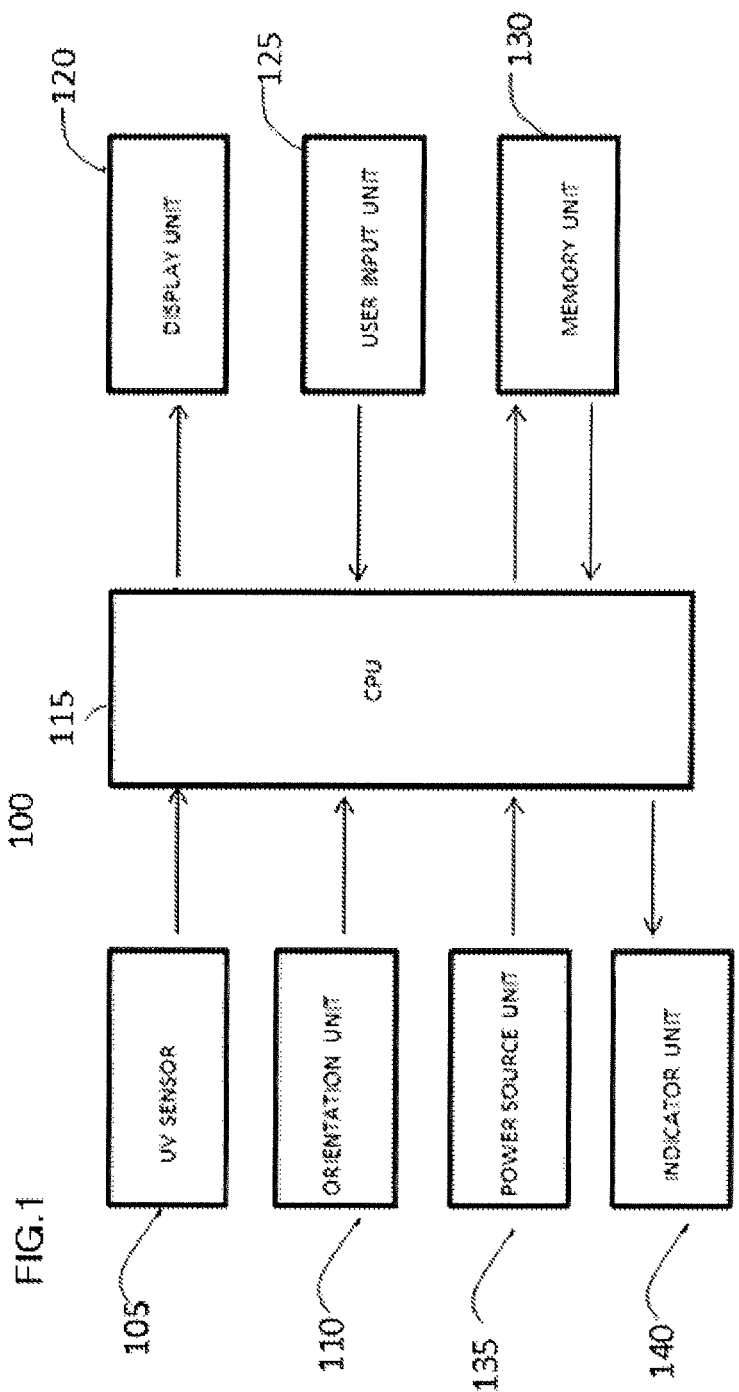
FIG. 1 is a block diagram of the operation of an exemplary UV monitoring device.

Overview:

While embodiments of this invention can take many different forms, specific embodiments thereof are shown in the drawings and will be described herein in detail with the understanding that the present disclosure is to be considered as an exemplification of the principles of the invention, and is not intended to limit the invention to a specific embodiment illustrated.

An embodiment comprises a portable device capable of notifying a user of both the ultraviolet index in the user's present environment and the direction of incoming UV radiation. It also is capable of recording the user's exposure to UV radiation over long periods of time and provides the user with recommendations as to how to minimize UV exposure if necessary.

An embodiment comprises an easily accessible device worn on the user's wrist, for example, that provides a user-interface that allows the user to input personal information such as skin type on the Fitzpatrick scale, the SPF value for the sunscreen being used, occupancy, and age. The embodiment also includes a UV radiation detector coupled to a processing unit that determines the UV index and direction of incoming UV light. This information is made available to the user via a display. Recorded UV index information is stored, and this stored information is used to provide recommendations to the user for minimizing risk from exposure to UV radiation, such as when to reapply sunscreen and what kind of clothes to be wearing.

An embodiment comprises a wireless transmitter that sends obtained information to the user's cell phone, computer, tablet, or other network-connected device. From the user's network-connected device, the user can view the information obtained by the radiation detector and monitor the user's long-term UV exposure via an interactive application that synchronizes with the device.

One embodiment is displayed in FIG. 1, a block diagram displaying the operation of an exemplary ultraviolet monitoring device. The UV monitoring system 100 includes a UV sensor 105, an orientation unit 110, a CPU (central processor unit) 115, a display unit 120, a user input unit 125, a memory unit 130, a power source unit 135, and an indicator unit 140.

The UV sensor 105 detects incidental radiation on the UV monitoring device 100. For example, the UV sensor 105 can comprise a photodiode, such as the TOCON_E2 by sglux, which continuously measures a voltage proportional to the UV index. UV sensor 105 also can include a plurality of individual UV sensors each facing a distinct direction. The CPU 115 receives and analyzes the measured data from the sensor 105 at a predetermined rate (e.g. once per second), and relays it to the memory unit 130, which can comprise any computer-readable memory. Stored information, including for example the UV index, the time, and a user nickname (set by the user upon device initialization) is displayed to the user via the display unit 120. The user inputs information to the device 100 via the user input unit 125. Such information may include, for example, the SPF value of sunscreen that the user applied and the time when it was applied. The user input unit 125 also can include a reset button to allow the user to restart measurement of UV radiation. In some embodiments, the CPU 115 uses the information received from the user input unit 125 to determine the amount of time that has elapsed since the user applied sunscreen and to generate user alerts. For example, it may alert the user via the display unit 120 to reapply sunscreen. Advice icons also may be displayed to the user via display unit 120. For example, the user can be notified of the optimal clothing to wear, whether to apply sunscreen of a particular SPF value, or whether to seek shade. Power is supplied by the power source unit 135, which may comprise a rechargeable battery that can be recharged either by USB connection or induction, for example. It also might comprise a solar cell. UV index information is displayed to the user in real time via the indicator unit 140, which may comprise 5 light emitting diodes (LEDS) that are the same colors, respectively, as the EPA UV-ladder color: green (0-2), yellow (3-5), orange (6-7), red (8-10), purple (11+).

Figure 2:
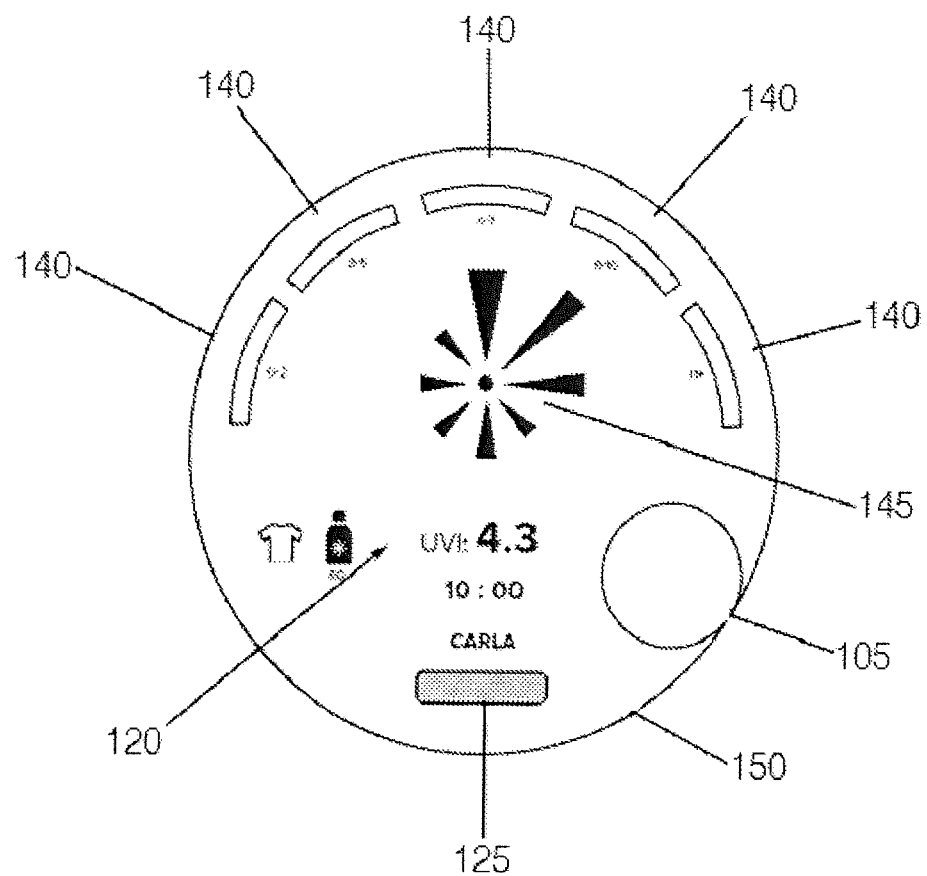
FIG. 2 depicts a front view of one embodiment.

FIG. 2 displays a front view of one example of a UV monitoring device 100. It may be worn on the wrist so as to allow the user to view the information on the display 120. The display 120 notifies the user of the remaining power of the power source unit 135, the time, the UV index, clothing recommendations, and the direction of incoming UV radiation via the directional indicator 145. Placement of the monitoring device 100 on the user's wrist also facilitates the UV detector 105 being able to detect an amount of UV radiation that is an accurate representation of the radiation to which the user actually has been exposed. The user inputs when sunscreen has been applied by pressing the user input unit 125 which starts a timer that will notify the user when sunscreen should be reapplied. In addition to displaying the UV index on the screen 120, the device also displays this information via the indicator unit 140 which comprises 5 LEDS that are the same color as the EPA UV-ladder color: green (0-2), yellow (3-5), orange (6-7), red (8-10), purple (11+). The device 100 is supported by housing 150, which can be waterproof, and also includes a means for attaching the housing to the user's body or to the user's clothing. The UV monitoring device of the present invention can take many forms and be attached to the user's body in a variety of different ways. For example, the housing can take the form of a pendant, a button, or a device having the appearance of a wristwatch, etc. The attachment means can take the form of a band, a strap, a chain, a clip, an eyeglass frame, glue, fasteners, thread, etc. A discussion follows of the exemplary embodiment of the device taking the form of a wrist watch, but similar techniques may be used for devices having different forms.

Typically, a UV monitoring device worn on the user's wrist will not have a constant orientation with respect to the UV radiation. This can affect the readings of the UV sensor 105, and would affect the accuracy of the value of the UV index displayed to the user but for the use of orientation unit 110. The orientation unit detects the orientation of the UV sensor 105 and outputs signals indicative of the displacement of the device from its default orientation. For example, orientation unit 110 can include, as is known in the art, a digital gyroscope, a digital three-axis gyroscope, a digital accelerometer, a combination of 3-4 accelerometers without a gyroscope, or a gyro sensor-accelerometer combination allowing for six axes of acceleration measurements. Using the signals output from the orientation unit 110, CPU 115 determines the orientation of the detection face of the UV sensor 105. For example, it could be facing upward (i.e. away from the ground), downwards (towards the ground), or in another direction. For purposes of the present application, the terms "upward" and "downward" include not only the directions pointing respectively directly away from and toward the center of the earth, but directions within a predetermined range of those directions. This predetermined range can be set at any value (e.g. 5 degrees), such that for any output of the orientation unit 110 indicating a device orientation within that range of degrees from the default orientation, an orientation of upward, for example, will be recorded for that output. CPU 115 concurrently records the UV index and device orientation at a predetermined frequency (e.g. 1/second), and the measured UV index from the UV sensor 105 is paired with its corresponding device orientation in a lookup table which is stored in memory unit 130. Using this data, CPU 115 creates a separate UV index average for each one of a number of pre-determined directions, which removes noise from the data collected to facilitate accurate monitoring of the user's exposure. In some embodiments, there can be multiple UV sensors, possibly with each of the multiple UV sensors facing different directions for a given orientation of the monitoring device. In that case, the information from each of the UV sensors can be used in the determination of the UV index average for each of the pre-determined directions.

Figure 3:
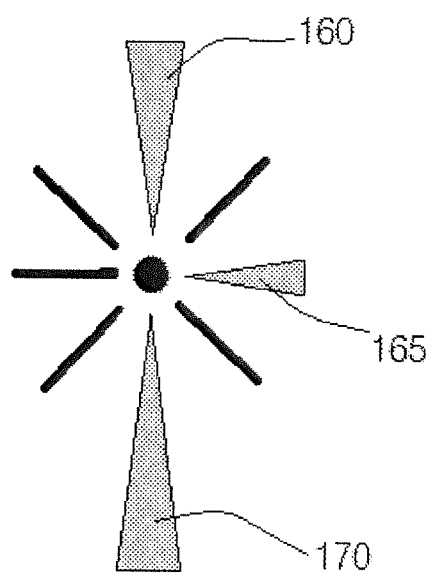
FIG. 3 is a close-up view of how the UV monitoring device of FIG. 2 will display the intensity of multiple directional components of incoming radiation to the user.

FIG. 3 is an example of a close-up view of the UV directional indicator 145. UV radiation is invisible, which makes it difficult for a person to determine the direction from which the radiation is coming. For example, one can be unexpectedly exposed to UV rays that are reflected from the surface of a building. The UV direction indicator 145 separately displays to the user the intensity of UV radiation coming from multiple different directions. As discussed above, the combination of the UV detector 105 and orientation unit 110 allow the device to determine separately the UV intensity for different directions. For example, the directions of from above, from one side, and from below may have been chosen when the CPU 115 was programmed. In other examples, other directions and another number of directions may have been chosen. Regardless of which directions have been chosen, this differentiation enables the user to determine the relative intensities of UV radiation coming from different directions. For example, if the largest average UV intensity measurement occurs from below, the user is notified of exposure to strong reflected UV radiation. The display 120 notifies the user of the relative magnitude of the measured average UV index in each of multiple directions using the directional indicator 145. For example, it can use one arrow that is representative of each one of the chosen directions, respectively. For example, the length of each arrow is representative of the average measured intensity of the UV radiation being received from the direction associated with that arrow as compared to that being received from the directions associated with the other arrows. In the example illustrated in FIG. 3, the lowest intensity of radiation is coming from the side, as indicated by the smallest arrow 165. The largest intensity of radiation is coming from the below, as indicated by the largest arrow 170. The medium-sized arrow 160 indicates to the user that an intermediate intensity of radiation is coming from above. Using these three arrows, the user can determine, if necessary, where protection is needed to prevent further exposure. The directional indicator also can display the magnitude of radiation received from each of multiple directions in other ways. For example, for each of the chosen directions, a corresponding number could be displayed, or a bar graph could be displayed, to provide a more accurate representation of the UV intensity being received from each of the directions, respectively.

Figure 4:
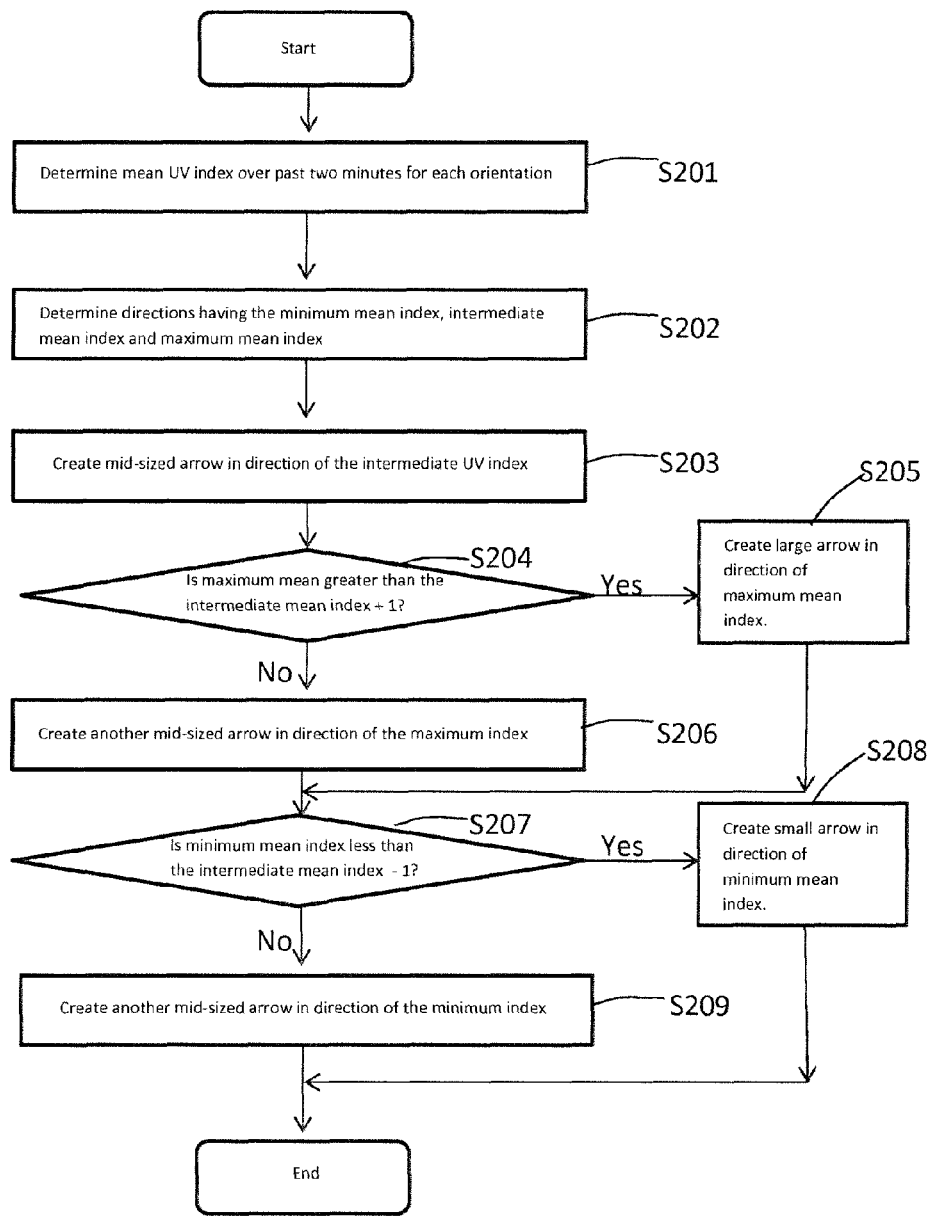
FIG. 4 is a flow diagram of a method used to display different sized arrows in different directions.

FIG. 4 is a flow diagram of a method used by CPU 115 to determine the size of each arrow in the example illustrated in FIG. 3. In S201, the mean UV index over a two minute period is calculated for each of the chosen directions. In S202, the chosen directions with the maximum, minimum and intermediate mean UV indices over a predetermined period are determined. A middle sized arrow is then set to be displayed in the direction of the intermediate measured UV index in step S203. To avoid misleading the user regarding the direction of incoming radiation, the small and large arrows are used only if the UV index in a particular direction differs from the intermediate UV index by more than one. In step S204, it is determined whether the maximum mean index measured in S202 is more than one greater than the intermediate mean index. If it is, the system moves to step S205, and a large arrow is used in the direction of the maximum mean index. If it is not, the system moves to S206, and a mid-sized arrow is used in the direction of the maximum mean index. In S207, it is determined whether the minimum mean index measured in S202 is more than one less than the intermediate mean index. If it is, the system moves to step S208, and a small sized arrow is used in the direction of the minimum mean index. If it is not, the system moves to step 209, and another mid-sized arrow is used in the direction of the minimum mean index. As a non-limiting example, the following pseudo-code exemplifies the method discussed above:

---

Every 2 minutes:
Bottom_mean = sum (UV_index_bottom_direction)/ #bottom_direction_values
Top_mean = sum (UV_index_top_direction)/ #top_direction_values
Side_mean = sum (UV_index_side_direction)/ #side_direction_values
Select the mid_value of the 3 means.
That value is drawn as a mid_size_arrow: Mid_size_arrow = mid_value_of_means.
Mid_size_arrow = mid_value_of_means
If (mid_value_of_means + 1) > max (top_mean, bottom_mean, side_mean)
    Then Mid_size_arrow = max (top_mean, bottom_mean, side_mean)
(arrow is assigned) Else large_size_arrow = max (top_mean, bottom_mean,
side_mean) (arrow is assigned)
If (mid_value_of_means - 1) < min (top_mean, bottom_mean, side_mean)
    Then Mid_size_arrow = min (top_mean, bottom_mean, side_mean) (arrow
is assigned) Else small_size_arrow = min (top_mean, bottom_mean,
side_mean) (arrow is assigned)
Start again every 2 minutes.

---

This method allows the system to display different sized arrows representing the UV radiation received from three chosen directions. This allows the user to get an accurate sense of where protection is needed with respect to potentially harmful UV radiation.

FIG. 5 depicts a system of using the UV monitoring device to allow both the user and the user's healthcare practitioner to view the information stored by memory on the device and to track the user's long term UV exposure. In the example of FIG. 5, the UV monitoring device 100 can connect via a wireless technology standard connection such as Bluetooth LE, for example, to the user's network connected device 200, such as a cell phone, a computer, a tablet, etc. When a connection with device 200 is established, an application on the device 200 will be opened. The device 200 receives information stored on the memory unit 130 of the UV monitoring device 100 at a predetermined frequency (e.g. every 15 minutes), including the peak and average UV indices measured, a timestamp, data obtained from the orientation unit, SPF application times, and user nickname. On this application (described in more detail below), the user will be able to view long term statistics about the user's long term UV exposure, and to enter information about received sunburn to allow for long term tracking of the user's sunburns. The application can also have the capability of the user inputting a location or the capability of tracking the user's location via GPS on the network connected device 200, to allow it to retrieve a location-specific UV index forecast for display. The user will have an account on the network server 300. From this account, personal information of the user; including age, occupation, ethnic origin, and skin type can be retrieved. This personal information will be input into a predictive model that will compare the user's UV exposure to that of someone having similar personal information. The predictive model also can be used to fill gaps in the user's long-term exposure data if the user fails to wear the device for an extended period of time. The user's healthcare practitioner 400 also will have access to the reports generated on the network server 300 via the Internet to provide the user with guidance on how to avoid harm to their skin from exposure. Such access may be via a transmission directed to a uniform resource identifier (URI) of the healthcare practitioner, via a web portal, or via a mobile application, for example. Every two weeks, for example, the user will receive by email a review of the user's exposure and some advice on how to improve the user's behavior if needed. As will be recognized by those in the art, there can be many variations of the example described above.

Figure 6B:
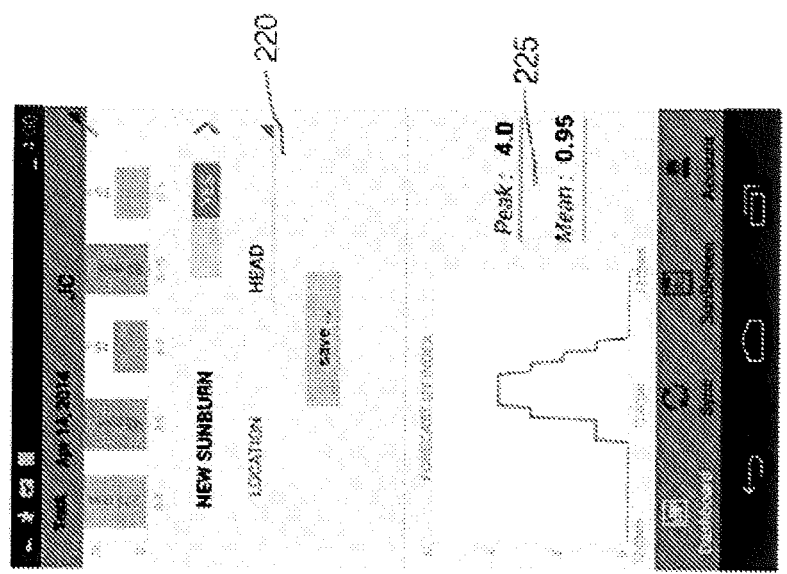
FIG. 6B displays an exemplary screenshot of an application that allows the user to input sunburns that the user experienced and to view a UV index forecast.
Figure 6A:
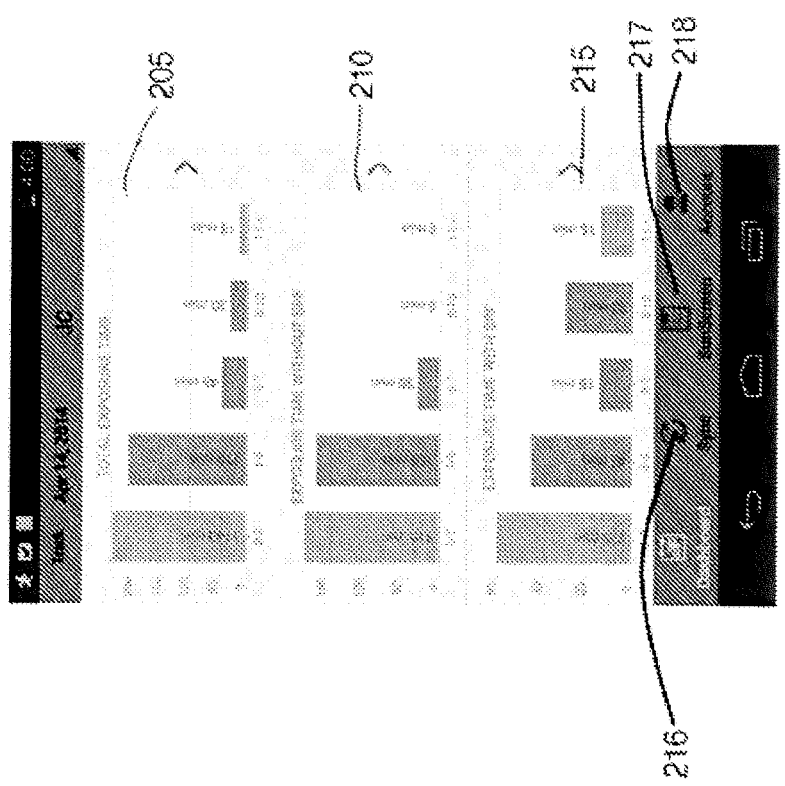
FIG. 6A displays an exemplary screenshot of an application that allows the UV monitoring device to display information to the user about the user's UV exposure.
Figure 6E:
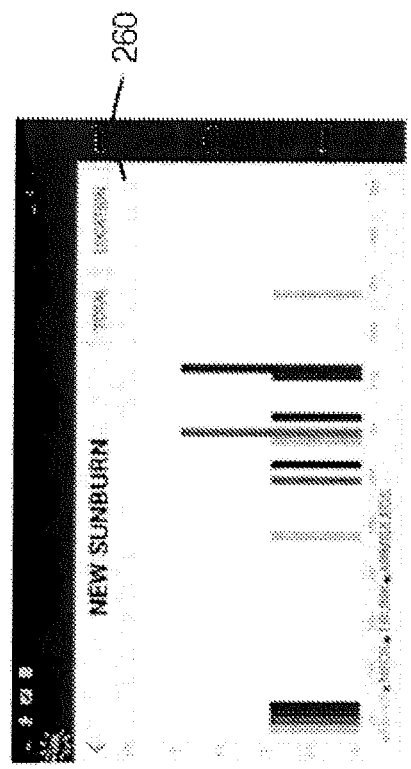
FIG. 6E displays an exemplary screenshot of an application that allows the UV monitoring device to display the number of sunburns that the user experienced in a given month.
Figure 6F:
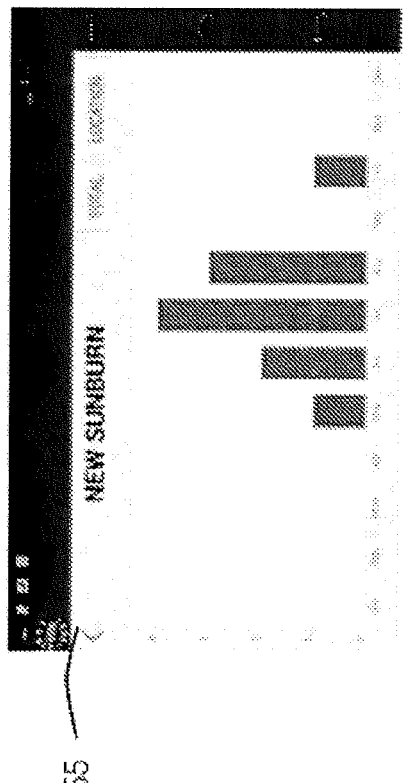
FIG. 6F displays an exemplary screenshot of an application that allows the UV monitoring device to identify to the user the locations on the user's body of the sunburns that the user experienced.

FIGS. 6A-6F provide exemplary screenshots of the application that allows the user to view the information collected by the UV monitoring device over long periods of time. FIG. 6A shows three graphs that are displayed to the user. The graph 205 notifies the user of the user's total exposure time to UV indices in various ranges. Graph 210 displays the amount of the total exposure without sunscreen, while graph 215 displays the amount of the total exposure with sunscreen. The user, by clicking on one of the graphs 205, 210, or 215, can display a total exposure time graph 230 or graph 235 seen in FIG. 6C, which display to the user total exposure as a function of time.

As seen in FIG. 6B, the application displays a UV index forecast 225 for the user's particular location obtained from the EPA website. As seen in FIG. 6C, the background of the time graph 230 can have the UV index forecast for the user to compare the measured UV index 232 to the forecast UV index 233 for the user's location. As also seen in time graph 230, the background also can include the EPA UV-ladder colors. As seen in similar time graph 235, the background can include indications of SPF protection during the same time periods.

The timeframe for which the total exposure time graph 230 shows the user's exposure depends on which time panel 231 is selected by the user. If the user selects the time panel 231 corresponding to one day, the total exposure time graph will show total time exposure to UV radiation by the hour (as displayed in FIG. 6C). However, the user also might select a time panel 231 corresponding to one week, one month, or one year for example. In those cases, the time graph would show total time exposure by the day, by the day or by the week, or by the week or by the month, respectively, as appropriate.

In FIG. 6D, time panels 240, 245 and 250 show daily exposure for a week, daily exposure for a month, and monthly exposure for a year, respectively. Time panels 240, 245 and 250 show the total exposures with SPF protection and without SPF protection.

When the application is open on the user's network connected device, bottom selection icons 216, 217, and 218 may be displayed as seen in FIG. 6A. By pressing icon 216, the user can sync the network connected device with the UV monitoring device to update the information displayed on the network connected device. When icon 217 is pressed, the user will be brought to a screen giving the user information about the sun, sun protection, how to avoid sun exposure and seek shade, clothing, how and when to apply sunscreen, and how to protect children. Icon 218 will allow the user to input account information to update the previously described predictive model.

As seen in FIG. 6B, the application provides a user input 220 that allows the user to communicate when, and the body location where, the user received sunburns. This allows the user's healthcare practitioner to monitor the user's skin condition. The user's inputs via the user input 220 are stored and placed into a chart 255 for user review. In the example displayed in FIG. 6E, the sunburn chart 255 displays the number of sunburns the user has received by month. If the user clicks on the sunburn chart 255, a more detailed sunburn chart 260 (seen in FIG. 6F) shows the body locations of the sunburns.

From the foregoing, it will be understood that numerous modifications and variations can be effectuated without departing from the true spirit and scope of the novel concepts of the present invention. It is to be understood that no limitation with respect to the specific embodiments illustrated and described is intended or should be inferred.

What is claimed is:

1. A device for monitoring a user's exposure to ultraviolet (UV) radiation, the monitoring device comprising:
   a UV sensor that detects UV radiation and that provides a signal indicative of an amount of the incidental UV radiation on the monitoring device, wherein the signal from the UV sensor is a voltage that is proportional to a UV index;
   a display unit;
   a power source;
   an orientation unit that detects displacement of the monitoring device from a default orientation and that transmits orientation data indicative of an orientation of the monitoring device;
   a control circuit including a processor, the processor being configured to receive the signal from the UV sensor, to receive the orientation data from the orientation unit, to determine a UV index value for radiation being received from each of a plurality of directions, respectively, and to communicate UV exposure information to the display unit for viewing by the user.

2. The device of claim 1, wherein the UV exposure information comprises a recommendation to the user for minimizing risk of harm from exposure to UV radiation.

3. The device of claim 2, wherein the recommendation to the user for minimizing risk of harm from exposure to UV radiation comprises an advice icon.

4. The device of claim 2, wherein the recommendation to the user for minimizing risk of harm from exposure to UV radiation comprises an advice icon indicating the optimal clothing to wear.

5. The device of claim 2, wherein the recommendation to the user for minimizing risk of harm from exposure to UV radiation comprises an advice icon indicating a particular SPF value of sunscreen to apply.

6. The device of claim 2, wherein the recommendation to the user for minimizing risk of harm from exposure to UV radiation comprises an advice icon indicating that the user should seek shade.

7. The device of claim 1, further comprising a user input unit configured to enable the user to input at least one of:
   a signal indicating that sunscreen has been applied;
   a signal indicating an SPF value of sunscreen that has been applied; and
   a signal to restart measurement of UV radiation.

8. The device of claim 1, further comprising an alai in unit configured to notify the user when a preset time period has elapsed since sunscreen was last applied.

9. The device of claim 1, further comprising:
   a wireless communication unit that receives information from a separate network connected device, and that transmits at least some of the UV exposure information to the separate network connected device;
   wherein the information received from the separate network connected device comprises at least one of environmental UV forecast information and user specific information.

10. The device of claim 1, further comprising a memory unit configured to store UV index data; to store the orientation data; to store user input signals, if there are any; to store information, if there is any, received from a separate network connected device; and to store program instructions that enable the processor to determine the UV index value for radiation being received from each of the plurality of directions, respectively, and to formulate the UV exposure information to be communicated to the display unit.

11. The device of claim 1, further comprising a wristband housing.

12. The device of claim 1, further comprising an indicator unit that comprises a plurality of light emitting diodes (LEDs), each one of the plurality of LEDs emitting light of a different color than is emitted by any other LEDs of the plurality of LEDs.

13. The device of claim 1, wherein the processor determines the UV index value for radiation being received from each of a plurality of directions by associating the UV radiation data received for each point in time with the orientation data received for the same point in time; and
   for each one of the plurality of directions, calculating a mean UV index of the UV radiation received from that one of the plurality of directions over a predetermined period of time.

14. The device of claim 13, wherein the processor associates a rank with each one of the plurality of directions based on the UV index value for the radiation received from that one of the plurality of directions during the predetermined period of time.

15. The device of claim 1, wherein the UV exposure information comprises information indicative of the UV index value for radiation being received from each of the plurality of directions.

16. A UV monitoring system comprising:
   the monitoring device of claim 1; and
   a separate network connected device;
   wherein the separate network connected device is configured to receive the UV exposure information from the monitoring device, and to transmit to the monitoring device information comprising at least one of environmental UV forecast information and user specific information.

17. The system of claim 16, wherein the user specific information comprises at least one of information input by the user and historical information regarding the user's UV exposure.

18. The system of claim 16, wherein the information input by the user comprises at least one of age, occupation, ethnic origin, skin type, when the user received sunburn, and the body location where the user received sunburn.

19. The system of claim 16, wherein the separate network connected device is configured to generate a predictive model that will compare the user's UV exposure to that of someone with similar personal information.

20. The system of claim 16, wherein the separate network connected device is configured to render a display showing a representation of the user's UV exposure over a period of time that is selected by the user.

21. The system of claim 20, wherein the representation of the user's UV exposure differentiates between exposure with sunscreen and exposure without sunscreen.

22. The system of claim 16, wherein the separate network connected device is configured to render a display showing a representation of the user's history of sunburn.

23. The system of claim 16 wherein the separate network connected device is configured to automatically transmit a report periodically that is accessible by a third-party device, the report comprising at least some of the UV exposure information and the information transmitted by the separate network connected device to the monitoring device.

24. A method for monitoring a user's exposure to ultraviolet (UV) radiation, the method comprising:
- a UV sensor, that detects UV radiation, transmitting a signal indicative of an amount of the UV radiation received, to a control circuit, wherein the signal from the UV sensor is a voltage that is proportional to a UV index;
- an orientation unit, that detects displacement of the UV sensor from a default orientation, transmitting orientation data, indicative of an orientation of the UV sensor, to the control circuit;
- a processor of the control circuit determining a UV index value for radiation being received from each of a plurality of directions, respectively; and
- the control circuit communicating UV exposure information to a display unit for viewing by the user, the UV exposure information being indicative of the UV index value for radiation received from each of the plurality of directions.

25. The method of claim 24, wherein the determining step comprises:
- associating UV radiation data transmitted for each point in time with the orientation data received for the same point in time; and
- for each one of the plurality of directions, calculating a mean UV index of the UV radiation received from that one of the plurality of directions over a predetermined period of time.

* * * * *

UNITED STATES PATENT AND TRADEMARK OFFICE
CERTIFICATE OF CORRECTION

PATENT NO. : 9,476,765 B2  Page 1 of 1
APPLICATION NO. : 15/082980
DATED : October 25, 2016
INVENTOR(S) : Lapiere et al.

It is certified that error appears in the above-identified patent and that said Letters Patent is hereby corrected as shown below:

In the Claims

Column 8, Line 11 (Line 1 of Claim 8), delete "alai in" and insert therefor --alarm--.

Signed and Sealed this
Third Day of January, 2017

Michelle K. Lee
*Director of the United States Patent and Trademark Office*